United States Patent
Ham

(10) Patent No.: US 10,282,713 B2
(45) Date of Patent: May 7, 2019

(54) BILL SPLITTING AND PAYMENT SYSTEM AND METHOD

(71) Applicant: Brandon Ham, Chicago, IL (US)

(72) Inventor: Brandon Ham, Chicago, IL (US)

(*) Notice: Subject to any disclaimer, the term of this patent is extended or adjusted under 35 U.S.C. 154(b) by 407 days.

(21) Appl. No.: 14/082,162

(22) Filed: Nov. 17, 2013

(65) Prior Publication Data

US 2014/0279098 A1   Sep. 18, 2014

Related U.S. Application Data

(60) Provisional application No. 61/790,324, filed on Mar. 15, 2013.

(51) Int. Cl.
  *G06Q 20/10* (2012.01)
  *G06Q 20/20* (2012.01)
  *G06Q 50/12* (2012.01)

(52) U.S. Cl.
  CPC ......... *G06Q 20/102* (2013.01); *G06Q 20/20* (2013.01); *G06Q 50/12* (2013.01)

(58) Field of Classification Search
  CPC ............................. G06Q 20/102; G06Q 50/12
  USPC .......................................... 705/15, 29, 34, 40
  See application file for complete search history.

(56) References Cited

U.S. PATENT DOCUMENTS

| | | | | |
|---|---|---|---|---|
| 2009/0037286 A1* | 2/2009 | Foster | .................. | G06Q 20/20 705/16 |
| 2013/0138518 A1* | 5/2013 | White | .................. | G06Q 20/204 705/16 |
| 2014/0136349 A1* | 5/2014 | Dave | .................. | G06Q 20/20 705/16 |
| 2014/0156517 A1* | 6/2014 | Argue | .................. | G07G 1/0081 705/40 |
| 2014/0164234 A1* | 6/2014 | Coffman | .................. | G06Q 20/14 705/40 |

* cited by examiner

*Primary Examiner* — A. Hunter Wilder
(74) *Attorney, Agent, or Firm* — Richards Patent Law P.C.

(57) ABSTRACT

The present subject matter discloses systems and methods in which a mobile application integrates with a restaurant's point of sale (POS) system such that, by providing a table identifier, users may split and pay an itemized bill, without the need of servers or restaurant staff.

11 Claims, 4 Drawing Sheets

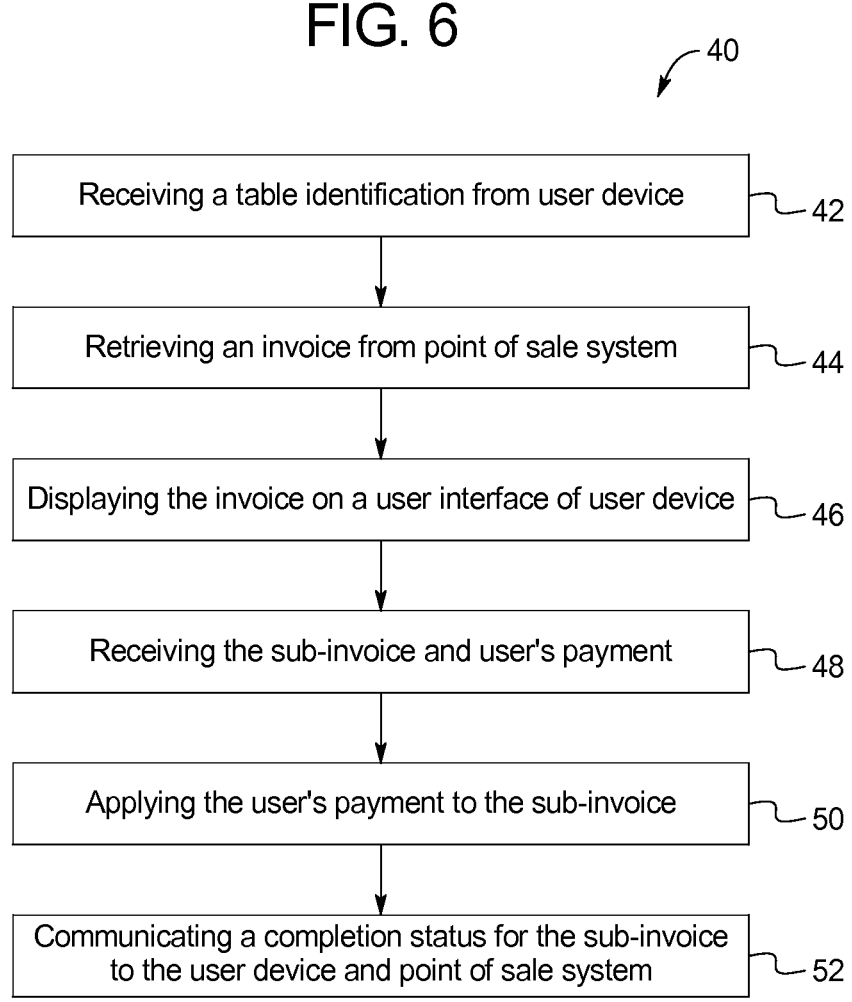

BILL SPLITTING AND PAYMENT SYSTEM AND METHOD

CROSS-REFERENCE TO RELATED APPLICATIONS

This application incorporates by reference and claims priority to U.S. Provisional Application No. 61/790,324 filed on Mar. 15, 2013.

BACKGROUND OF THE INVENTION

The present subject matter relates generally to systems and methods adapted to provide bill splitting and payment functionality. More specifically, the present subject matter provides a solution in which a mobile application integrates with a restaurant's point of sale (POS) system such that by providing a table identification, users may split and pay an itemized bill, including various tipping options, without the aid of servers or restaurant staff.

From both a customer's perspective and a server's perspective, it can be difficult, unpleasant, and inefficient to pay for a meal at a restaurant. The server must bring the bill to the table, the patron must determine a payment method and provide some physical form of payment (e.g., cash or transaction card), the server must return to the table to collect the payment and, in situations in which the patron is paying using a transaction card, return to the table for the patron's signature. Even when the customer pays in cash, the server may need to return to the table to bring appropriate change. Each piece of the transaction is fraught with inefficiencies. For example, the server is required to wait for the patron to produce a payment method, which may involve the server stopping by the table a couple of times to see if the patron has produced a payment method. Similarly, the patron who might be in a hurry must wait on the waiter to reappear at the patron's table in the midst of the waiter taking care of numerous other tables, all at different points along the dining process, in order to process the payment.

These issues increase in severity as the number of people dining in a group grows. Often, larger groups will desire to split the payment amongst a number of patrons. This often requires a calculation of each individual's contribution, coordination of multiple payment methods and/or the coordination of payment between patrons at the table. These complications can affect both the customers and the servers. Many times customers will write down the amount owed on the back of the bill and provide multiple payment methods for the server to manage. Other times, customers will ask that the bill be split, requiring more time and energy from the server, who must recall which items each customer is responsible for. What is needed is an easy way to add up an individual's contribution to the bill, calculate and add required tax, calculate and add desired or included tip, and pay electronically without physical media.

There is no successful solution on the market that addresses these concerns. Accordingly, there is a need for bill splitting and payment system and methods, as described and claimed herein.

BRIEF SUMMARY OF THE INVENTION

The present subject matter discloses systems and methods in which a mobile application integrates with a restaurant's point of sale (POS) system such that, by providing a table identifier, users may split and pay an itemized bill, without the need of servers or restaurant staff.

The bill payment system includes a controller and a memory coupled to the controller, wherein the memory is configured to store program instructions executable by the controller. In response to executing the program instructions, the controller is configured to receive a table identification from a user device. In an example, the table identification is a QR code. In response to the receipt of the table identification, the controller is configured to retrieve an invoice from a point of sale system, wherein the invoice is associated with the table identification and further includes a plurality of line items comprising an invoice total.

The controller is configured to display the invoice on a user interface accessible through the user device, wherein the user interface includes a user input mechanism adapted to receive a user's selection of one or more of the line items and generate a sub-invoice based on the user's selection. The user payment may include credit card information. The user interface is adapted to receive a user payment for the sub-invoice. The controller is also configured to apply the user payment to the sub-invoice and communicate a completion status for the sub-invoice to the user device and point of sale system.

The controller may be configured to receive user selection and user payment from more than one user interface for a single invoice. Further, the controller is configured to apply the user payment to the sub-invoice from more than one user interface for a single invoice.

In another embodiment, the bill payment system includes a controller in communication with a user interface and a point of sale system, wherein the controller is adapted to provide a bill payment application accessible through the user interface. The bill payment application receives a table identification from the user interface, receives and displays an invoice from the point of sale system corresponding to the table identification, and receives user selection and user payment through the user interface. The bill payment application generates a sub-invoice in response to the user selection, applies the user payment to the sub-invoice, and communicates a completion status for the sub-invoice to the point of sale system.

In an example, the user selection may be a line item selected from the invoice. The bill payment application may be configured to receive and apply the user selection and the user payment from multiple user interfaces for a single invoice. The bill payment application may display an updated invoice to the user interface after the bill payment application communicates a completion status for at least one sub-invoice to the point of sale system. In another example, the bill payment application may provide and display invoice splitting options.

The present disclosure also provides bill payment methods. In an embodiment, the method includes a first step of receiving a table identification from a user device. The second step includes retrieving an invoice from a point of sale system in response to the receipt of the table identification, wherein the invoice is associated with the table identification and further includes a plurality of line items comprising an invoice total. The third step includes displaying the invoice on a user interface accessible through the user device, wherein the user interface includes a user input mechanism adapted to receive a user's selection of one or more of the line items and generate a sub-invoice based on the user's selection, further wherein the user interface is adapted to receive a user payment for the sub-invoice. The fourth step includes applying the user payment to the sub-invoice. The fifth step includes communicating a completion status for the sub-invoice to the user device and point of sale system.

In an example, the method includes receiving user selection and user payment from more than one user interface for a single invoice. The method may include applying more than one user payment to a single invoice. As discussed above, the table identification may include a QR code. In another example, the user payment may include credit card information.

An advantage of the methods and systems disclosed herein is that with minimal user action through a user's interface, a bill can be split and paid without the aid of a server.

Another advantage of the methods and systems disclosed herein is that the bill may easily be split, allowing for customers to individually select which items to pay for or allowing for customers to select to jointly pay for various items, without relying on a server.

A further advantage of the methods and systems disclosed herein is that multiple customers may pay the bill through a restaurant's point of sale system, without the aid of a server.

Yet, another advantage of the methods and systems disclosed herein is that the method provides a customizable bill splitting method that may automatically calculates tip, tax, and the customer's portion of the bill.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 6 is a schematic of an example of an embodiment of the method disclosed herein.

DETAILED DESCRIPTION OF THE INVENTION

The present disclosure provides for systems and methods relating to bill payment. Specifically, the system 10 disclosed herein provides a user with a customizable bill payment option surrounding an invoice associated with the user's table. The system 10 completes a user's bill payment without involving the inefficiencies associated with conventional bill payment methods. Specifically, system 10 allows a user to retrieve the bill associated with the user's table, select certain items from the bill to pay for, and complete payment of the user's bill, all without the assistance of a server.

Figure 1:
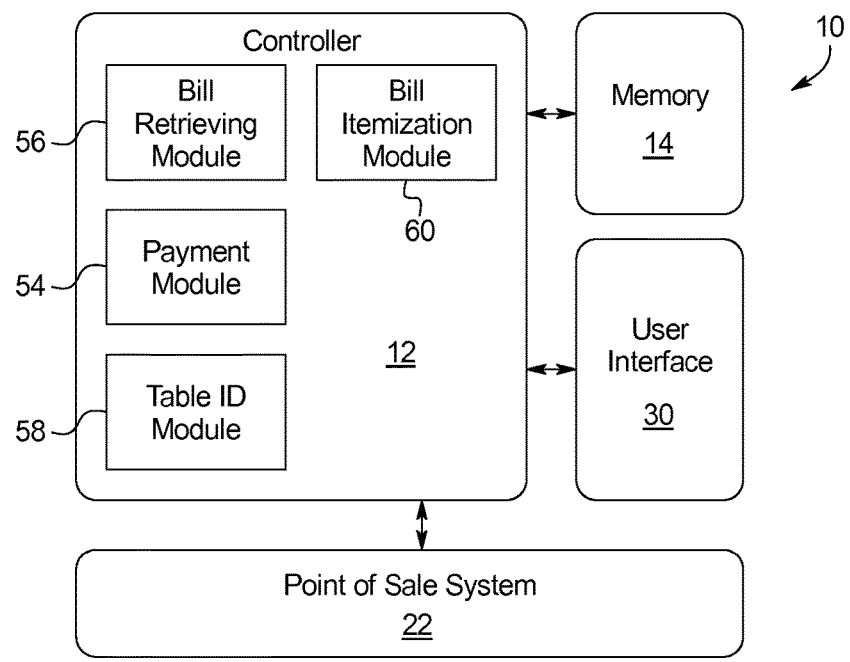
FIG. 1 is a schematic of an example of an embodiment of the system disclosed herein.

As shown in FIG. 1, the bill payment system 10 includes a controller 12, a memory 14 coupled to the controller 12, wherein the memory 14 is configured to store program instructions executable by the controller 12. In an example, the controller 12 and memory 14 may be included in a portable electronic user device 18 having a user interface 30. For example, the user device 18 may be a touchscreen-enabled smartphone.

As further shown in FIG. 1, the controller 12 may embody a plurality of modules: a payment module 54, a bill retrieving module 56, a table identification module 58, a bill itemization module 60, among others, which are illustrated as discreet elements merely for clarity in the description. It is understood that the modules may be aspects of a unified payment application or may be broken into as many discrete elements as desired for purposes of accomplishing the solutions provided herein.

Figure 2:
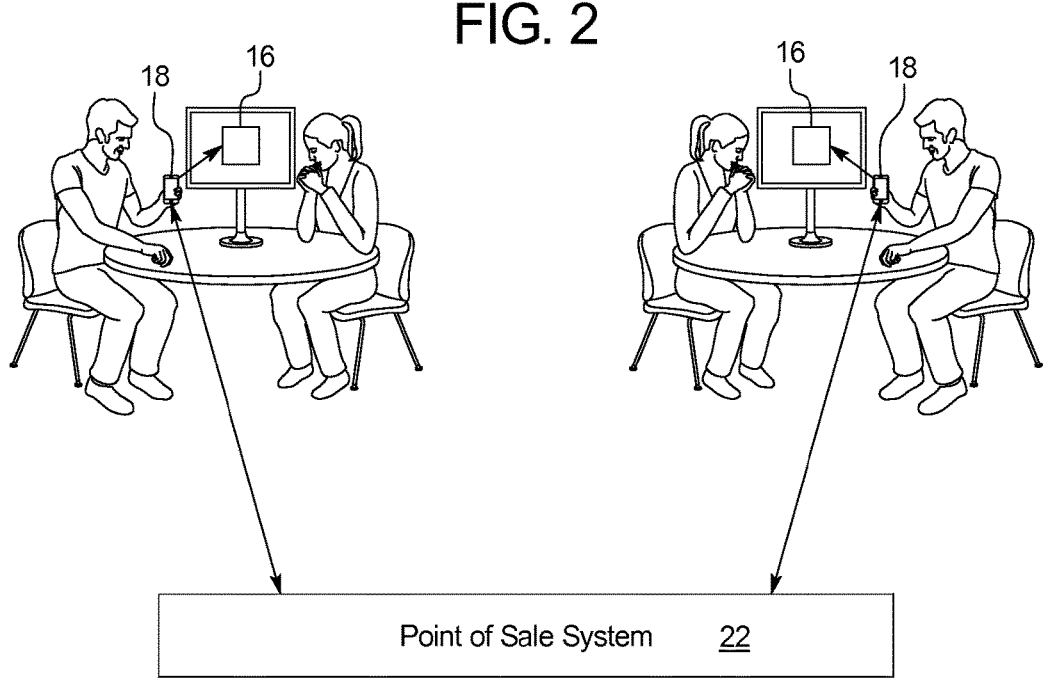
FIG. 2 is a schematic of an example of an embodiment of the system disclosed herein wherein the system supports multiple users.

In response to executing the program instructions, the controller 12 is configured to receive a table identification 16 from a user device 18, as shown in FIG. 2. The table identification 16 may be a number associated with the user's table, wherein the number is also associated with a restaurant's point of sale (POS) system. The input of the table identification 16 may include user action through the user interface 30 of typing in the table number on a real or displayed key pad on the a user interface 30. Alternatively, the user action may include scanning or taking a picture of the table identification 16 that includes a quick response (QR) code or bar code displayed on the table using a camera functionality of the user device 18, as shown in FIG. 2. In an example, the system 10 may prompt a user to scan a QR code upon activating the system 10. For example, a user may activate the system 10 by selecting a payment application 62 through the user interface 30.

Figure 3:
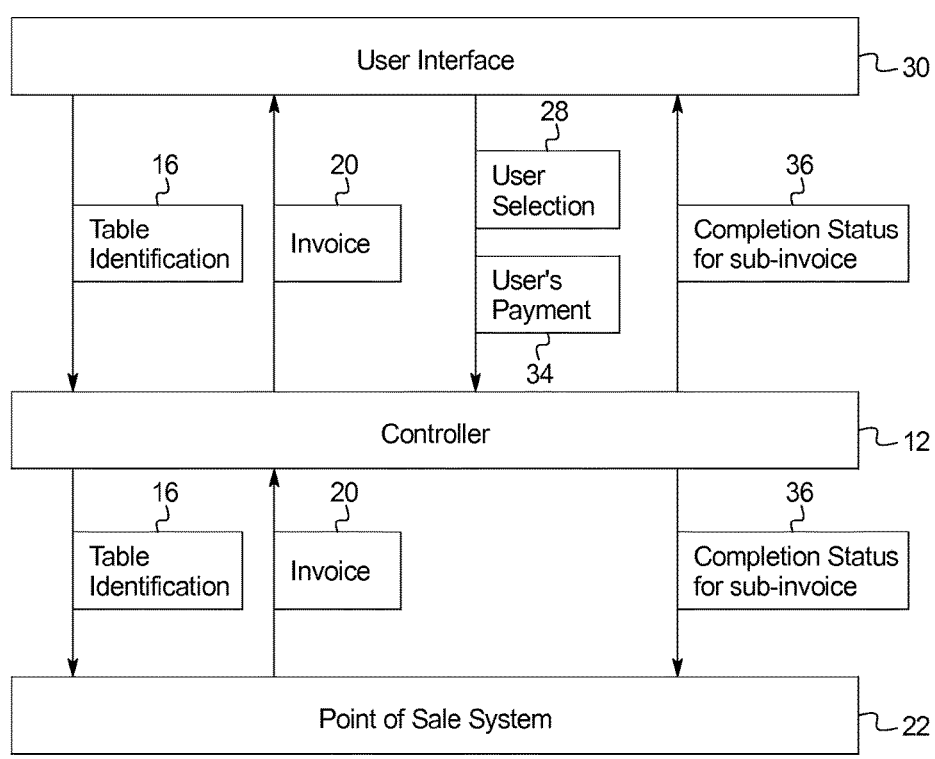
FIG. 3 is a flow chart of an example of an embodiment of the system disclosed herein.
Figure 4:
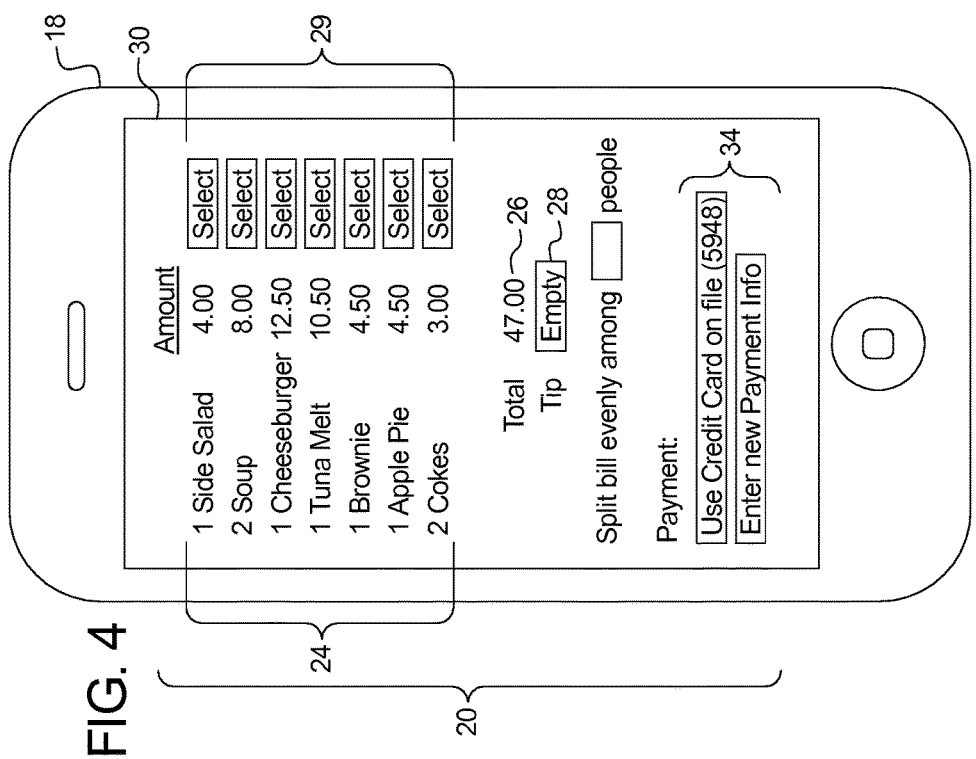
FIG. 4 is a front view of an example of a user device with a displayed invoice.

As shown in FIGS. 2-3, in response to receiving the table identification 16, the controller 12 is configured to retrieve an invoice 20 from a point of sale system 22, where the invoice 20 is associated with the table identification 16. The invoice 20 includes a plurality of line items 24 and an invoice total 26. An example of an invoice 20 displayed on a user interface 30 is shown in FIG. 4. The line items 24 are each item the user is purchasing. For example, the plurality of line items 24 in FIG. 4 includes a side salad, soup, cheeseburger, tuna melt, brownie, apple pie, and coke. The cost and quantity of each item may be displayed next to the item, as well as a prompt 29 associated with user selection 28. The invoice 20 may be displayed on the user interface 30 in any number of formats including listing the line items 24 or displaying pictures of the items associated with the line items 24. For example, the line item 24 associated with the order of two cokes could be displayed on the user interface 30 as a picture of two cokes.

The controller 12 is further configured to display the invoice 20 on a user interface 30 accessible through the user device 18, wherein the user interface 30 includes a user input mechanism adapted to receive a user's selection 28 of one or more of the line items 24. The user input mechanism may include any input mechanism known by those skilled in the art. For example, the user input mechanism may include typing on an actual or displayed keyboard, selecting an item by touching the user interface 30, among others. In addition, the user input mechanism may include dragging certain items from the displayed itemized bill to a desired position on the user interface 30 that is designated for each person's bill.

The user selection 28 may include an addition of gratuity to the bill based on an amount or percentage, the selection of certain items to pay for from the line items 24, the selection of certain items to be paid by a different user, among other options. Alternatively, the controller 12 may be configured to display various bill splitting options such as an option to split the bill evenly among a number of users or by a percentage.

Figure 5:
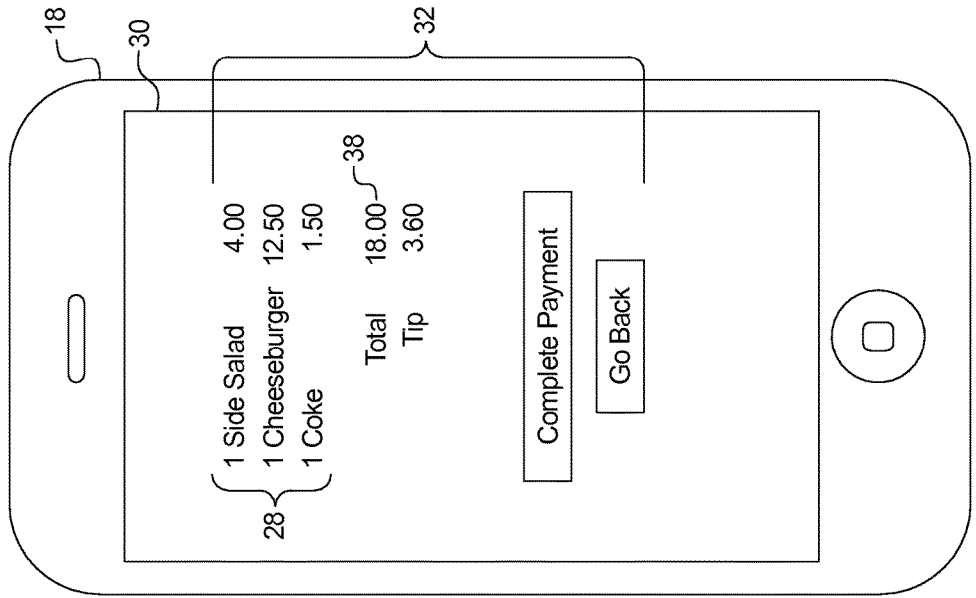
FIG. 5 is a front view of an example of a user device with a displayed sub-invoice.

The controller 12 is further configured to, upon receiving user selection 28, generate a sub-invoice 32 based on the user's selection 28. As shown in FIG. 5, the controller 12 may be configured to display a sub-invoice total 33 on the user interface 30, for example, for a user to confirm the user selection 28 was correct. It is contemplated that the controller 12 may be configured to allow a user selection 28 associated with the user denying confirmation of the sub-invoice 32. Upon receiving such user selection 28, the controller 12 may redisplay the invoice 20 with the line items 24 and receive user selection 28. The controller 12 would then apply the user selection 28 to recalculate the sub-invoice 32 and display the corrected sub-invoice 32 on the user interface 30.

An example of a sub-invoice 32 is shown in FIG. 5. The user in this example selected the line items 24 including the side salad, cheeseburger, and coke from the line items 24 displayed in the invoice 20 in FIG. 4. The sub-invoice total 33 is also displayed as well as the amount of tip the user selected. The sub-invoice 32 includes a user selection mechanism that either confirms or denies the sub-invoice total 33. For example, the user selection mechanism may include user action associated with confirmation of the sub-invoice total 33 of selecting "complete payment" or user action associated with denying confirmation by selecting "go back" that re-displays the invoice 20 if the user needs to change his or her user selection 28.

The controller is also configured to receive a user payment 34. The user payment 34 may be received at the same time as the user selection 28 is received. Alternatively, the user payment 34 may be received after the controller 12 displays the sub-invoice 32 on the user interface 30. For example, a user payment 34 may only be entered once the user confirms the sub-invoice 32. The user payment 34 may be associated with credit or debit card information, a personal account in connection with the restaurant's POS system 22, among other payment methods.

Upon receipt of the user selection 28 and the user payment 34, the controller 12 is configured to apply the user payment 28 to the sub-invoice 32. Once completed, the controller 12 is configured to communicate a completion status for the sub-invoice 32 to the user device 18 and the point of sale system 22.

It is contemplated that one or more customers may interact with the payment system 10 through a network. Communication through the network enables the payment system 10 to provide an interactive website and/or mobile application through which the customers may share information and otherwise communicate. Networked communication further enables the payment system 10 to facilitate the sharing and updating of information with a restaurant's POS system.

For example, instead of a party of four at a restaurant waiting for the server to produce the bill that they would have to figure out how to split, either by items or equally, the system 10 may be used by each party to pay for their own share or split evenly without the need of a server to retrieve a bill, split payment, and communicate payment to the restaurant's POS. Instead, each party simply uses the system 10 to pay for a portion of the invoice 20 using their own user device 20. System 10 allows for efficient payment without the need for multiple users associated with a single invoice 20 to produce a credit card or cash to a server.

In another embodiment, the bill payment system 10 includes a controller 12 in communication with a user interface 30 and a point of sale system 22, wherein the controller 12 is adapted to provide a bill payment application accessible through the user interface 30. The bill payment application receives a table identification 16 from the user interface 30, receives and displays an invoice 20 from the point of sale system 22 corresponding to the table identification 16, and receives user selection 28 and user payment 34 through the user interface 30. The bill payment application generates a sub-invoice 32 in response to the user selection, applies the user payment 34 to the sub-invoice 32, and communicates a completion status for the sub-invoice 32 to the point of sale system 22.

It is understood that the payment application may facilitate communication between multiple parties wishing to contribute to the bill. For example, the payment application may be accessible through one or more user interface 30. Further, the payment application may be adapted to receive and apply user selection 28 from more than one user interface 30.

The present disclosure also provides bill payment methods 40, as shown in FIG. 6. In an embodiment, the method 40 includes step 42 of receiving a table identification 16 from a user device 18. The second step 44 includes retrieving an invoice 20 from a point of sale system 22 in response to the receipt of the table identification 16, wherein the invoice 20 is associated with the table identification 16 and further includes a plurality of line items 24 comprising an invoice total 26. The third step 46 includes displaying the invoice 20 on a user interface 30 accessible through the user device 18, wherein the user interface 30 includes a user input mechanism adapted to receive a user's selection 28 of one or more of the line items 24 and generate a sub-invoice 32 based on the user's selection 28, further wherein the user interface 30 is adapted to receive a user payment 34 for the sub-invoice 32. The fourth step 50 includes applying the user payment 34 to the sub-invoice 32. The fifth step 52 includes communicating a completion status for the sub-invoice 32 to the user device and point of sale system 22.

As mentioned above and schematically shown in FIG. 1, aspects of the systems and methods described herein are controlled by one or more controllers 12. The one or more controllers 12 may be adapted to run a variety of application programs, access and store data, including accessing and storing data in the associated databases 16, and enable one or more interactions as described herein. Typically, the controller 12 is implemented by one or more programmable data processing devices. The hardware elements, operating systems, and programming languages of such devices are conventional in nature, and it is presumed that those skilled in the art are adequately familiar therewith.

For example, the one or more controllers 12 may be a PC based implementation of a central control processing system utilizing a central processing unit (CPU), memory 14 and an interconnect bus. The CPU may contain a single microprocessor, or it may contain a plurality of microprocessors for configuring the CPU as a multi-processor system. The memory 14 may include a main memory, such as a dynamic random access memory (DRAM) and cache, as well as a read only memory, such as a PROM, EPROM, FLASH-EPROM, or the like. The system may also include any form of volatile or non-volatile memory 14. In operation, the memory 14 stores at least portions of instructions for execution by the CPU and data for processing in accord with the executed instructions.

The one or more controllers 12 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 12 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces 30 for the controller 12. For example, the one or more controllers 12 may include a graphics subsystem to drive the output mechanism. The links of the peripherals to the system may be wired connections or use wireless communications.

Although summarized above as a PC-type implementation, those skilled in the art will recognize that the one or more controllers 12 also encompasses systems such as host computers, servers, workstations, network terminals, and the like. Further one or more controllers 12 may be embodied in a device, such as a mobile electronic device, like a smartphone or tablet computer. In fact, the use of the term controller 12 is intended to represent a broad category of components that are well known in the art.

Hence aspects of the systems and methods provided herein encompass hardware and software for controlling the relevant functions. Software may take the form of code or executable instructions for causing a controller 12 or other programmable equipment to perform the relevant steps, where the code or instructions are carried by or otherwise embodied in a medium readable by the controller 12 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 12 can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method may be provided based on various combinations of the features and functions from the subject matter provided herein.

The invention claimed is:

1. A bill payment system comprising:
a controller; and
a memory coupled to the controller, wherein the memory is configured to store program instructions executable by the controller;
wherein in response to executing the program instructions, the controller is configured to:
receive a table identification from a user device;
in response to the receipt of the table identification, retrieve an invoice from a point of sale system, wherein the invoice is associated with the table identification and further includes a plurality of line items comprising an invoice total;
display the invoice on a user interface accessible through the user device, wherein the user interface includes user input mechanisms including a user input mechanism adapted to receive a user's selection of one or more of the line items and generate a sub-invoice based on the user's selection, a user input mechanism to split the invoke evenly among a number of users, and a user input mechanism to split the invoice by a percentage, further wherein the user interface is adapted to receive a user payment for the sub-invoice;
receive the sub-invoice and the user payment;
apply the user payment to the sub-invoice;
communicate a completion status for the sub-invoice to the user device and point of sale system;
share the completion status for the sub-invoice with a second user paying a second sub-invoice of the invoice;
apply the user payment of the sub-invoice to the invoice; and
display an updated invoice on the user interface accessible through the user device after the completion status for the sub-invoice has been received by the user device.

2. The system of claim 1 wherein the table identification comprises a QR code.

3. The system of claim 1 wherein the user payment comprises credit card information.

4. The system of claim 1 wherein the controller is configured to receive sub-invoices and user payment from more than one user interface for a single invoice.

5. The system of claim 1 wherein the controller is configured to apply the user payment to the sub-invoice from more than one user interface for a single invoice.

6. A bill payment method comprising:
receiving a table identification from a user device;
retrieving an invoice from a point of sale system in response to the receipt of the table identification, wherein the invoice is associated with the table identification and further includes a plurality of line items comprising an invoice total;
displaying the invoice on a user interface accessible through the user device, wherein the user interface includes user input mechanisms including a user input mechanism adapted to receive a user selection of one or more of the line items, a user input mechanism to split the invoice evenly among a number of users, and a user input mechanism to split the invoice by a percentage;

generating a sub-invoice based on the user selection, further wherein the user interface is adapted to receive a user payment for the sub-invoice; applying the user payment to the sub-invoice;

communicating a completion status for the sub-invoice to the user device and point of sale system;

share the completion status for the sub-invoice with a second user paying a second sub-invoice of the invoice;

applying the user payment of the sub-invoice to the invoice; and displaying an updated invoke on the user interface accessible through the user device after the completion status for the sub-invoice has been received by the user device.

7. The method of claim 6 wherein the table information comprises a QR code.

8. The method of claim 6 wherein the user payment comprises credit card information.

9. The method of claim 6 further comprising generating more than one sub-invoice for a single invoice.

10. The method of claim 6 further comprising receiving user selection and user payment from more than one user interface for a single invoice.

11. The method of claim 10 further comprising applying more than one user payment to the single invoice.

* * * * *